United States Patent [19]
Fournier et al.

[11] 3,981,704
[45] Sept. 21, 1976

[54] METHOD AND APPARATUS FOR PROCESSING GLASS

[75] Inventors: Wilfred A. Fournier, Heath; Elmer P. Rieser, Pickerington, both of Ohio

[73] Assignee: Owens-Corning Fiberglas Corporation, Toledo, Ohio

[22] Filed: Dec. 20, 1974

[21] Appl. No.: 534,616

[52] U.S. Cl. .................................. 65/2; 65/11 W; 65/12; 65/29; 65/164; 65/335
[51] Int. Cl.² ........................................ C03B 37/02
[58] Field of Search ............ 65/1, 2, 11 W, 12, 164, 65/29, 134, 335

[56] References Cited
UNITED STATES PATENTS

| | | | |
|---|---|---|---|
| 3,012,373 | 12/1961 | Willis | 65/1 X |
| 3,401,536 | 9/1968 | Glaser | 65/1 |
| 3,573,014 | 3/1971 | Strickland et al. | 65/2 X |
| 3,701,642 | 10/1972 | Stream | 65/2 X |
| 3,829,301 | 8/1974 | Russell | 65/2 |

Primary Examiner—Robert L. Lindsay, Jr.
Attorney, Agent, or Firm—John W. Overman; Ronald C. Hudgens; Harry O. Ernsberger

[57] ABSTRACT

This invention embraces a method of and apparatus for processing heat-softenable fiber-forming material, such as glass, involving treatment of a surface of a feeder from which flow streams of the heat-softened glass through the establishment of an environment at the surface in which a heat-decomposable gas is heat decomposed providing a gas resulting from the decomposition of a character promoting separation of the glass from the surface thereby minimizing or eliminating the tendency for the material to flood at the feeder surface, effecting pressure through the heat-softened glass in a supply chamber, transferring glass from the chamber to the stream feeder, and effecting pressure through the heat-softened glass in the feeder to prevent or eliminate permeation or filtering of the gas formed by heat decomposition through the material of the feeder into the softened glass thereby enhancing the uniformity of glass streams flowing from the feeder.

25 Claims, 5 Drawing Figures

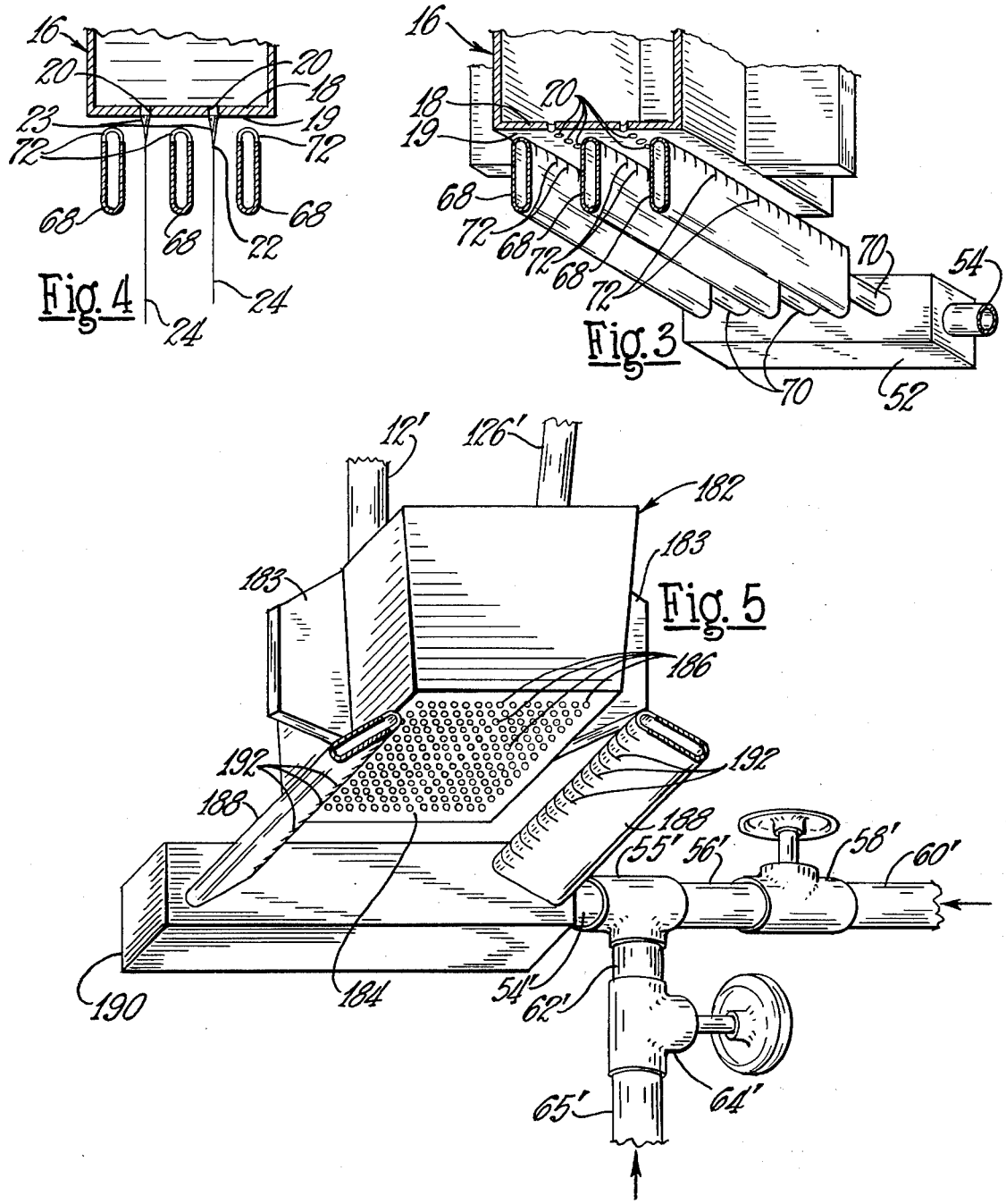

METHOD AND APPARATUS FOR PROCESSING GLASS

In the formation of fibers or filaments from heat-softened glass, it is a usual practice to flow heat-softened glass through passages or orifices in spaced projections depending from a floor section of a stream feeder to provide individual streams which may be attenuated to fibers or filaments. It is well known that heat-softened glass tends to flood over the surface of a stream feeder and the provision of the projections individual for each stream tends to retard or impede the glass from wetting and flooding the surface of the stream delivery region of the feeder or bushing. Endeavors have been pursued to flow streams of glass through orifices or passages in a planar feeder floor without the use of depending projections, but in this form of feeder floor construction the heat-softened glass readily tends to flood over the feeder surface rendering it difficult to maintain the streams separate and discrete so that they may be attenuated into fibers or filaments.

Developments have been carried on wherein a heat-decomposable organic gas is decomposed by the heat of the feeder and the glass to form hydrogen and carbon effective at the interfacial region of the glass with the surface to promote separation of the glass from the surface and thereby minimize or eliminate flooding. Such an environment enables the forming of individual beads of glass at the orifices which fall by gravity in a short time and enable the start-up of attenuation in a minimum of time as the glass of the streams does not tend to flood the surface of the feeder.

It is found that free hydrogen or other gas or carbon particles derived from the heat decomposition or pyrolysis of a heat-decomposable material are effective to minimize or prevent the flooding of the glass, but there is a tendency for the gas resulting from decomposition to permeate or penetrate through the material of the feeder floor section resulting in minute bubbles or seeds of the gas in the heat-softened glass in the feeder.

The invention embraces a method of and apparatus for providing an environment at the glass stream flow region of a stream feeder involving heat decomposition of a heat-decomposable material in an inert gas wherein the material is decomposed providing a gas resulting from the decomposition as an antiflooding medium in the inert environment and effecting pressure through the heat-softened glass in the feeder to resist penetration, permeation or filtering of the gas resulting from decomposition through the floor section of the feeder into the glass.

The invention embraces a method of and apparatus for providing an environment at the glass stream flow section of a stream feeder or bushing involving heat decomposition of an organic or hydrogen-bearing material in an inert gas of the environment providing free hydrogen as an antiflooding medium and establishing pressure on the heat-softened glass in the feeder to resist penetration, permeation or filtering of the hydrogen through the floor section of the feeder into the glass.

Another object of the invention involves a method of establishing an environment at the stream flow region of a feeder from which flow streams of glass including a hydrogen-bearing material which is decomposed in the environment providing hydrogen at the stream flow surface of the feeder of a character promoting separation of the heat-softened glass from the feeder, and establishing pressure on the heat-softened glass in the feeder wherein the pressure on the glass is controlled or regulated to an extent effective to substantially eliminate or prevent permeation or penetration of the hydrogen through the material of the feeder floor.

Another object of the invention resides in a method of and means for establishing a supply of heat-softened glass under pressure in a chamber, flowing the heat-softened glass from the chamber into a stream feeder, and maintaining a controlled pressure through the glass in the stream feeder to prevent a gas at the stream flow environment having antiwetting characteristics from permeating or penetrating through the material of the stream feeder floor section into the glass in the stream feeder.

Another object of the invention resides in a method of and means for melting glass in a chamber, pressurizing the glass in the chamber to promote flow of the glass from the chamber into a stream feeder, and pressurizing the glass in the stream feeder independent of pressure changes in the melting chamber.

Further objects and advantages are within the scope of this invention such as relate to the arrangement, method of operation and function of the related elements, to various details of construction and to combinations of parts, elements per se, and to economies of manufacture and numerous other features as will be apparent from a consideration of the specification and drawing of a form of the invention, which may be preferred, in which:

FIG. 3 is a fragmentary isometric view of the stream feeder and means for establishing an antiflooding environment;

FIG. 4 is a transverse sectional view through the lower region of the stream feeder, and FIG. 5 illustrates a modified arrangement for providing an antiflooding environment for a stream feeder.

Figures 1, 2:
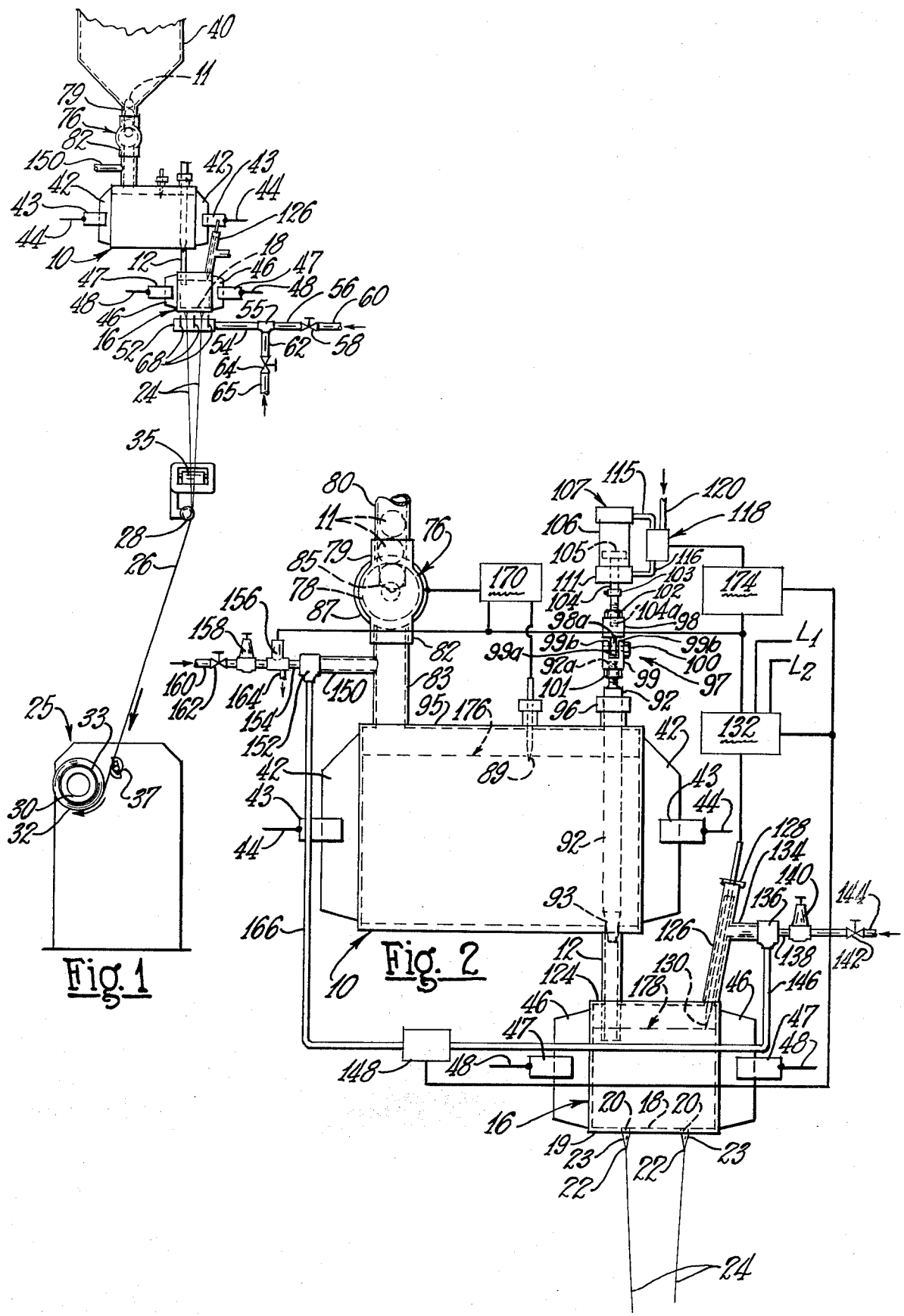
FIG. 1 is a semischematic view of an arrangement for reducing glass to a heat-softened condition and flowing stream of the glass under pressure from a feeder for attenuation to fibers or filaments, the arrangement including means providing an environment at the stream delivery region of the feeder fostering antiflooding of the feeder.
FIG. 2 is an enlarged view of the glass melting and stream feeder arrangement shown in FIG. 1.

Referring to the drawings in detail and initially to FIG. 1, there is illustrated a receptacle, chamber or melter 10 in which pieces of glass 11 or glass batch may be reduced to a molten state or condition providing a supply of heat-softened glass. While pieces or marbles of glass 11 are illustrated in FIGS. 1 and 2, it is to be understood that glass batch may be used and reduced to a molten condition to provide a supply of heat-softened glass. The heat-softened or molten glass is flowed through a passage means provided by a tubular member 12 into a stream feeder or bushing 16 having a floor section 18 of planar shape provided with rows of orifices or passages 20 as particularly shown in FIGS. 3 and 4 through which flow streams 22 of glass. The melter 10 and the stream feeder or bushing 16 are encased in and supported by refractory (not shown) in a conventional manner.

Each of the glass streams 22 adjacent the stream delivery surface of the feeder floor or section 18 is in the form of a cone 23 as particularly shown in FIGS. 2 and 4. As illustrated in FIG. 1, the glass streams flowing from the orifices 20 are attenuated to fibers or filaments 24 by winding a strand or group 26 of the filaments into a package on a winding machine 25. The filaments are converged into a strand 26 by a gathering member or shoe 28.

The winding machine 25 is equipped with a rotatable collet 30 driven by a motor (not shown), the strand 26 being wound into a package 32 on a thin-walled tube 33 mounted on the collet 30. The collet 30 is rotated by a speed to attenuate the streams of glass to fibers or filaments at a comparatively high linear rate. An applicator 35 is disposed adjacent the gathering shoe 28 for applying sizing or other coating material onto the filaments in advance of their convergence into the strand 26.

A rotatable and reciprocable traverse or traverse member 37 engages the strand 26 for distributing the strand lengthwise of the collet 30 and for oscillating the strand to effect a crossing of the individual wraps or convolutions of strand during the collection of the strand into the package, the traverse means being of conventional character such as illustrated in the U.S. Pat. to Beach No. 2,391,870.

The feeder or bushing 16 is fashioned of a high temperature resistant material, such as an alloy of platinum and rhodium, or a high temperature resistant ceramic or the like. Such materials are normally readily wetted by molten glass which tends to flood over the stream flow surface areas of stream feeders fashioned of such materials.

The supply chamber 10 and the passage means, such as the tubular member 12, are fashioned of a high temperature resistant material such as an alloy of platinum and rhodium or other suitable material capable of withstanding the temperature of the molten glass.

Pieces or marbles 11 of refined glass or glass batch from a supply contained in a receptacle 40 are delivered into the melter 10 in a manner hereinafter described. In the embodiment illustrated, the pieces of glass or glass batch are reduced to a molten condition in the melter 10 by electric energy establishing a supply of molten glass. The melting chamber 10 is provided at its ends with terminal lugs 42 to which are secured terminal clamps 43 connected with electric current supply conductors 44.

The heat-softened or molten glass in the stream feeder or bushing 16 is maintained at the proper temperature and viscosity by electric energy so that the streams 22 of glass flowing from the feeder are in condition for attenuation to fibers or filaments 24. The ends of the feeder 16 are provided with terminal lugs 46 to which are secured terminal clamps 47 connected with electric current supply conductors 48.

An environment is established or provided adjacent the stream flow region of the floor section of the feeder of a character for substantially eliminating or minimizing the tendency of the glass to flood over the planar surface 19 of the feeder floor section 18 and to effectively isolate the streams of glass one from another whereby the streams may be successfully attenuated into continuous fibers or filaments and whereby restarting of attenuating operations may be resumed in a short period of time following filament breakouts.

The establishment of the environment to substantially eliminate or minimize flooding of the glass over the feeder floor surface involves establishing an interfacial condition of the feeder floor surface fostering separation of the glass from the surface.

The environment is of substantially isolating, non-oxidizing or inert character and provides a region in which a heat-decomposable material, such as an organic gas, hydrocarbon or other gas, is present which is decomposed by the heat of the glass and feeder providing nascent hydrogen or other gas and/or carbon which is effective at the glass interface to separate the glass from the feeder floor surface. One such method and arrangement for minimizing or substantially eliminating wetting of the feeder surface by the glass and thereby reducing or eliminating the tendency of the glass to flood at the feeder surface is described in U.S. Pat. to Russell No. 3,829,301.

A similar arrangement or apparatus for carrying out the method for promoting separation of glass from the feeder surface is illustrated herein in FIGS. 1, 3 and 4. The apparatus is adapted for feeding or delivering gases to the region of the glass stream flow area or surface 19 of the orificed feeder floor section 18 of the feeder 16, the gaseous environment embracing the glass streams 22 at the regions of the cones 23.

Disposed adjacent the stream feeder 16 is a manifold 52 provided with a supply pipe 54 for supplying gases to the manifold 52. The pipe 54 is connected with a tee fitting or mixing chamber 55, one branch of the tee being connected with a pipe 56, the latter being connected with an adjustable valve 58. The valve 58 is connected with a pipe 60 which receives an inert gas from a supply (not shown) such as carbon dioxide for establishing the inert or nonatmospheric environment at the stream flow region of the stream feeder 16. The valve 58 is adapted to regulate or control the delivery of the carbon dioxide or other inert gas to the manifold 52.

A tube or pipe 62 is connected with a branch of the tee 55 and with an adjustable valve 64. A pipe 65 connected with the regulating valve 64 is adapted to convey an organic or hydrocarbon gas, such as propane, to the inert gaseous environment at the stream flow region of the feeder. The inert gas in the pipe 56 and the hydrocarbon gas in the pipe 62 are mixed in the fitting or chamber 55, the gaseous mixture flowing through pipe 54 into the manifold 52.

Disposed beneath the stream feeder 16 and adjacent the orificed regions of the feeder floor section are gas delivery means or distributors which, in the embodiment shown in FIGS. 1, 3 and 4, comprise tubular members 68. The members 68 are preferably of hollow flat cross section as shown in FIGS. 3 and 4 whereby the members may be accommodated between rows of glass streams flowing from the orifices 20 in the feeder floor section 18.

The tubular or hollow gas-delivery members 68 are supported by the manifold 52 by tubes or tubular members 70 connected with the manifold and the members 68, shown in FIG. 3. The members 68 are provided with gas-delivery outlets or passages 72. In the embodiment shown in FIGS. 3 and 4, the outlets 72 are in the form of narrow slots arranged in spaced relation lengthwise of the members 68 whereby the delivered inert gas, such as carbon dioxide, provides nonoxidizing environment at the stream flow region embracing or encompassing the cones of glass of the streams.

The outlets 72 are closely spaced so as to provide for uniform distribution of the delivered gases throughout the surface area of the feeder floor 18 which would normally be subject to wetting by the molten glass. The molten glass in the feeder is at a temperature preferably between 2200°F. and 2500°F. in which range the viscosity of the glass is such that glass streams readily flow through the orifices 20.

Prior to initiating attenuating operations, an inert or nonoxidizing gas such as carbon dioxide and a heat-decomposable gas, such as propane, dichlorodifluoromethane, or other heat-decomposable gas susceptible of evolving a nascent gas such as hydrogen are fed through pipe 54, manifold 52, pipes 70 into the tubular member or distributor 68, the gases being under comparatively low pressures and moving at low velocities to minimize turbulence in the isolating environment at the stream flow region. The flow rates of the gases and the proportions of propane or other heat-decomposable gas and carbon dioxide may be regulated by manipulation of the valves 58 and 64.

During start-up of attenuating operations, the operator manually draws the filaments 24 formed from the glass streams into a strand 26 and winds a few turns of the strand on the packaging tube 33 mounted on the collet 30. The operator then energizes the winding machine motor (not shown) which rotates the collet at a speed to attenuate the streams of glass to fibers or filaments which are collected in strand formation into a package 32 on the packaging tube 33.

The comparatively high temperatures of 2200°F. or more of the feeder and the glass at the feeder floor region effects pyrolysis or decomposition of the propane gas or other decomposable gas and the occurring reaction breaks down or decomposes the propane or other gas in the carbon dioxide or inert environment resulting in the formation or evolution of a nascent gas, some of which is adsorbed and diffuses into the surface of the stream feeder floor section 18. Where a hydrocarbon is decomposed, pyrolytic carbon of fine particle size is formed in addition to nascent hydrogen.

The decomposition products, viz. carbon, hydrogen or other gas thus formed in the isolating or inert environment, being substantially nonwettable by glass, tend to separate the glass from the surface area of the feeder floor and hence eliminate or greatly reduce the tendency for the glass to flood. The decomposition products have an effect on the molten glass resisting the tendency of the beads of glass, formed at the orifices during start-up operations, to be joined as they are prone to do in a normal atmospheric environment.

Any carbon on the surfaces of the intensely hot cones of glass or streams, upon moving out of the isolating or inert environment into the air, combines with atmospheric oxygen under the influence of the high temperatures forming water and carbon dioxide which are dissipated into the atmosphere.

Through the antiwetting properties of the products of decomposition, during bead formation at the start of attenuation, adjacent beads may be in contact one with another but are not joined. Upon falling of the beads of glass, they are in discrete form and the glass streams remain discrete and each is attenuated into a fiber or filament without flooding of the glass at the stream delivery region of the feeder.

Other gases may be utilized to provide the isolating, inert or nonoxidizing environment at the stream feeder floor surface region. Such gases include nitrogen, helium, argon, neon and xenon where a heat-decomposable hydrocarbon is employed in the environment.

Other gases which will be decomposed under the high temperatures of molten glass to result in evolved hydrogen or other gas in addition to propane are methane, ethane, butane, isobutane, ethylene, propylene, acetylene, cyclopropane, naphthene and dichlorodifluoromethane. It is found that the decomposable gas in a range of one-half of one percent to five percent of the total volume of gases delivered from the distributors 68 obtains a nonwetting effect.

It is believed that the decomposition products, viz. carbon, hydrogen or other nascent gas promote the separation of the glass from the feeder surface thus providing the antiwetting characteristics of the glass at the feeder surface. It is found that there is a tendency for the hydrogen or other gas resulting from heat decomposition adsorbed at the feeder surface to permeate or migrate through the metal or material of the feeder floor section to form small bubbles or seeds in the molten glass in the feeder adjacent the floor section. The presence of bubbles or seeds impairs the flow of streams of glass through the orifices, a condition which fosters breakage of the filaments being attenuated from the streams.

The invention embraces a method of and apparatus for providing or establishing pressure through the glass in the stream feeder to substantially eliminate or prevent the permeation or penetration of the hydrogen through the feeder floor section 18. The arrangement includes a glass melting chamber providing a supply of heat-softened glass in which pressure is established for flowing glass into the stream feeder 16 as hereinafter explained.

Provision is made for introducing pieces 11 of glass, such as spheres or marbles of glass, or glass batch into the melting or glass supply chamber 10, the arrangement including provision for venting the melting chamber during the introduction of marbles of glass or glass batch and permitting melting and conditioning of the glass in the chamber at atmospheric or other desired pressure. The marble or glass batch feeding means is of a rotary character for maintaining pressure in the melting chamber 10 prior to and during delivery of molten glass to the feeder 16, the embodiment of the rotary marble feeding means illustrated herein being similar to the type disclosed in the U.S. Pat. to Stream No. 3,701,642.

The marble or glass batch feeder arrangement herein illustrated includes a housing 76 enclosing a cylindrical rotor or marble feeder 78 associated with pressure sealing means (not shown) which may be of the character illustrated in the U.S. Pat. to Stream No. 3,701,642. The housing 76 has an upwardly extending tubular portion 79 connected with a tube or chute 80 associated with the lower end of the hopper or receptacle 40 containing spheres or marbles 11 of glass or glass batch. The housing 76 is fashioned with a depending tubular portion 82 which is connected by a tubular member or pipe 83 with the upper region of the melting or glass supply chamber 10.

The rotor or rotary feeder 78 is fashioned with a shallow radial bore, compartment or recess 85 of a dimension to loosely receive a glass marble 11 as illustrated in broken lines in FIG. 2 or a charge of glass batch. The rotor 78 is adapted to be rotated by a motor 87 by a control means hereinafter described. The rotor 78, in the position illustrated in FIGS. 1 and 2, receives a glass marble 11 from the tube 80. When the rotor 78 is rotated through one hundred eighty degrees, the marble in the recess 85 is in registration with the tube 83 and falls by gravity through the tube 83 into the melting or glass supply chamber 10.

As hereinafter described, the motor 87 is energized by means activated by a sensing means or sensor 89 arranged to sense the level of the molten glass in the chamber 10. The hopper 40 may contain glass batch which may be fed into the melting chamber 10 by rotation of the rotor 78 as the recess 85 may receive and contain a charge of glass batch in the same manner as it receives a glass marble. During rotation of the rotor 78, marbles of glass or charges of glass batch are successively delivered into the melting or supply chamber 10. Sufficient residence time is provided for the glass in the melter chamber 10 to permit adequate homogenization and seed removal from the glass prior to its delivery into the feeder 16.

Means is provided for controlling the flow of molten glass from the supply chamber 10 through the tube or pipe 12 into the feeder or bushing 16. With particular reference to FIG. 2, a valve body or rod 92 is vertically disposed in the melting chamber 10 and is fashioned with a tapered valve portion 92 at its lower extremity which, in closed position, seats against the interior rim or edge of the passage means or tube 12 in which position the valve interrupts flow of glass from the chamber 10 to the stream feeder or bushing 16. The valve body or rod 92 is fashioned of an alloy of platinum and rhodium or other suitable material capable of withstanding the temperature of the molten glass.

The valve body 92 extends through an opening in the cover or roof 95 of the chamber 10 and through a gland-type fitting 96, the fitting forming a pressure seal with the valve body 92 but permitting vertical movement of the valve body. The valve or valve body 92 is actuated by a piston rod 104 equipped at its upper end with a piston 105, the piston being reciprocable in a cylinder 106 of a fluid actuator 107. The valve body 92 is connected with the piston rod 104 by an articulated or flexible coupling construction 97 in order to provide for proper alignment of the valve portion 93 with the tubular member 12. The articulated coupling construction includes members 98 and 99.

Member 98 has a projecting portion or tongue 98a which extends into a slot or kerf 99a in the member 99, the slot being of a width loosely accommodating the projection 98a between the furcations 99b provided by the slot. The projection 98a and the furcations 99b are provided with aligned openings accommodating a pin or screw 100. The member 99 is provided with a threaded bore accommodating a threaded portion 92a formed on the rod 92, the portion 92a being provided with a lock nut 101.

The member 98 has a threaded bore which receives a threaded portion 104a formed on the piston rod 104, the threaded portion 104a being provided with a lock nut 102. The threads in the members 98 and 99 are respectively right-hand and left-hand threads, this construction being adapted for turnbuckle-like adjustment so that by rotative movement of the assembly of members 98 and 99 and the pin 100, the valve rod 92 may be adjusted with respect to the piston rod 104. An adjustable abutment 103 on the piston rod 104 limits the extent of opening of the valve 93.

After adjustment, the nuts 101 and 102 are drawn up to lock the valve rod 92 in adjusted position with respect to the member 99, and to lock the member 98 in adjusted position with respect to the piston rod 104. The articulate connection or coupling formed by the members 98 and 99 and the pin 100 facilitates alignment of the valve portion 93 of the valve body 92 with the port provided by the entrance of the tubular member 12.

The piston 104 of the actuator 107 is adapted to be moved to positions opening and closing the valve portion 93 by pressure fluid, such as compressed air, alternately admitted to opposite ends of the cylinder through pipes or tubes 115 and 116 connected with a conventional four-way solenoid-actuated valve means 118. The valve means 118 is supplied with compressed air or other fluid from a supply by a tubular member 120, the valve means 118 being provided with a venting arrangement (not shown) for alternately venting the opposite ends of the cylinder when fluid pressure is applied to one side or other of the piston 104 by operation of the valve means 118.

The roof or cover 124 of the stream feeder or bushing 16 is provided with an upwardly extending tubular member 126, the upper end of the tubular member 126 being sealed by a closure 128. A glass level sensing means, probe or member 130 is contained within and electrically insulated from the member 126, the sensing means being connected with a time-delay relay 132 of conventional construction. The probe member 130 is of lesser diameter than the interior of the tubular member 126 to facilitate the flow of compressed air or other gas under pressure into the upper region of the stream feeder or bushing 16 for pressurizing and maintaining pressure on the molten glass in the stream feeder 16.

Connected with the tubular member 126 is a laterally extending pipe 134 connected with a tee-shaped fitting 136, one branch of the fitting being connected by a pipe 138 with a pressure regulator 140 of conventional construction, the pressure regulator being connected through an adjustable control valve means 142 with a pipe or tubular member 144, the latter being connected with a supply of compressed air or other gas under pressure. The other branch of the fitting 136 is connected by a pipe 146 with an adjustable pressure differential switch 148.

Connected with the tube 83 is a laterally extending tube or pipe 150 connected with a tee-shaped fitting 152. One branch of the fitting 152 is connected by a pipe 154 with a solenoid-operated valve means 156 which, in turn, is connected with a pressure regulator 158. The other branch of fitting 152 is connected by means of a pipe or tube 166 to differential pressure switch 148, so that the pressure difference across switch 148 is the same as that between the melter 10 and feeder 16. The pressure regulator 158 is connected with a supply of compressed air by a pipe or tube 160 through an adjustable control valve 162. The solenoid-operated valve means 156 is provided with a vent pipe 164 for relieving pressure or venting the chamber 10 during the operation of feeding glass marbles or glass batch by the rotor 78 into the chamber 10.

Pressure is supplied by compressed air or other gas under pressure to the bushing or stream feeder 16 through the pipe 144, adjustable control valve 142, pressure regulator 140, pipe 138, fitting 136, pipe 134 and member 126. Pressure is provided on the glass in the melting or supply chamber 10 from a supply of compressed air or other gas under pressure through pipe 160, adjustable valve 162, pressure regulator 158, solenoid-operated valve means 156, pipe 154, fitting 152 and pipes 150 and 83. A branch of the fitting 152 is connected by a pipe 166 with the pressure differential switch 148.

Electric current is supplied through current supply lines L1 and L2 to the level sensing time-delay relay 132 through the circuit illustrated schematically in FIG. 2 to a level sensing relay 170, the solenoid-operated valve 156, a circuit-interlocking relay 174 and the pressure differential switch 148. The glass level sensing relays 132, 170, the pressure differential switch 148, the circuit interlocking relay 174 and the solenoid-operated valves 118 and 156 are of conventional construction.

The method of operation of the arrangement is as follows:

Electric current is flowed from conductors 44 through the melter or supply chamber 10 to melt the glass marbles or glass batch fed into the melter, and current is flowed from conductors 48 through the stream feeder or bushing 16 to maintain molten glass delivered into the stream feeder from the chamber 10 at the proper temperature for attenuation of the streams of glass 22 into fibers or filaments 24.

The antiwetting environment is established by feeding a nonoxidizing or inert gas, such as carbon dioxide, through the pipe 60 past the valve 58 and through the pipe 56 to the tee fitting 55. The hydrogen-bearing material or hydrocarbon gas, such as propane, is delivered from a supply through pipe 65, regulating valve 64 and pipe 62 to the fitting 55. The mixture of nonoxidizing gas and the hydrogen-bearing material, organic or hydrocarbon gas flows through pipe 54 and manifold 52 and the gases delivered from the distributors 68 to the region adjacent the stream flow section of the feeder floor 18.

A period of time is required to reduce the glass marbles or glass batch in the melter or supply chamber to molten condition and flow the molten glass into the stream feeder 16 until the feeder is substantially filled. The electric current flow to heat the feeder 16 is regulated to condition the glass viscosity high enough so that the glass does not flow through the orifices 20 when the feeder 10 is unpressurized. After the stream feeder 16 and melter 10 are filled with heat-softened glass, heating of the feeder is increased to lower the viscosity of the glass, the glass in the feeder 16 and melter pressurized, and the antiwetting environment established at the stream flow region as the flow of streams of glass from the feeder is initiated.

At the start of operations, the probe 130 in the stream feeder 16 is not engaged with glass and hence, through the level sensing relay 132 and the interlocking relay 174, which is controlled by the differential switch 148, the solenoid-operated four-way valve means 118 is activated whereby compressed air from a supply flows through pipes 120 and 116 to the lower end of the cylinder 106, elevating the piston 104 and moving the valve 93 to open position. The solenoid-operated valve 156 is closed, preventing air pressure being exerted or established in pipes 150, 83 and the melter chamber 10.

As the level sensing means 89 is not in contact with glass, the motor 87 is activated through the glass level sensing relay 170 to rotate the feeder rotor 78 and thereby successively feed marbles of glass or charges of glass batch into the melter chamber 10. As the marbles of glass or glass batch are delivered into the melter chamber 10, the glass is rendered molten by electric current flow through the melter as the glass becomes molten or flowable in the melter 10, the valve 93 being open, the molten glass flows through the tube 12 into the bushing 16.

When the level of the glass in the stream feeder 16 engages the probe 130, the sensing relay 132 is activated to activate the interlocking relay 174 to energize the solenoid-operated valve means 118 shifting the valve to a position to exert air pressure through pipe 115 into the cylinder above the piston 104 and venting the region below the piston 104. The pressure above the piston moves the valve body 92 downwardly causing the valve 93 to interrupt the flow of molten glass from the melter into the stream feeder 16.

Glass marbles or glass batch continue to be fed into the melter or chamber 10 by rotation of the feeder rotor 78 until the glass in the melter engages the sensing means 89. Engagement of the glass with the sensing means or probe 89 activates the relay 170 to de-energize the motor 87, thus interrupting the feed of glass marbles or glass batch into the melter 10. The level sensing relay 170 concomitantly activates the solenoid-operated valve 156 to open the valve thereby facilitating flow of compressed air from the supply pipe 160 through the pressure regulator 158, fitting 152, pipes 154, 150 and 83 to exert pressure on the glass in the melter.

The valve 142 is opened by the operator whereby compressed air is admitted from pipe 144 past the pressure regulator 140 through the fitting 136 and pipes 134 and 126 to establish pressure on the glass in the stream feeder 16. Electric current flow to the stream feeder 16 is adjusted by the operator to heat the glass in the feeder to a temperature and viscosity to effect flow of streams 22 of glass through the orifices 20 in the feeder floor section. The operator concomitantly manipulates the valves 58 and 64 to provide the mixture of heat-decomposable hydrogen-bearing gas and an inert gas which flows from the slots 72 in the distributors or hollow members 68 establishing the nonwetting environment at the stream flow region.

The differential pressure switch 148 is adjusted so that when molten glass delivery to the feeder 16 is required, the pressure on the molten glass in the melter 10 is at least equal to or slightly greater than the pressure on the molten glass in the stream feeder 16 to assure that the molten glass from the melter 10 will flow or be transferred into the stream feeder 16.

The operator then initiates the operation of attenuating the stream to filaments by manually winding a few turns of a strand of the filaments onto the packaging tube 33 on the mandrel 30 and energizes the motor of the winding machine 25 to wind the strand into a package. The glass of the streams 22, in the absence of the environment at the stream flow section of the feeder of the nonoxidizing or inert gas and the decomposable gas to form hydrogen, would result in the flooding or tendency of flooding of the glass over the surface of the feeder floor section.

Through the utilization of the isolating or inert environment and the decomposition of a hydrogen-bearing material in the environment to form free hydrogen at the stream flow region of the feeder, the tendency for the glass of the streams to flood over the feeder surface is substantially eliminated or reduced so that individual beads of glass from which each of the passages or orifices will fall with a trailing filament without flooding of the glass at the surface of the feeder floor. The antiwetting characteristics provided by the free hydrogen at the interfacial region of the glass with the surface of the feeder floor section enable successful start-up operations.

It is found that a pressure established by the compressed air or other gas on the glass in the stream feeder 16 of about eighteen pounds per square inch provided by compressed air or other gas is effective to prevent the free hydrogen from permeating or filtering through the floor section of the stream feeder and thereby eliminating bubbles of hydrogen or "seeds" in the glass in the interior of the stream feeder and hence reducing filament "break-outs".

Transfer of molten glass from the supply chamber or melter 10 through the passage means 12 into the stream feeder 16 lowers the level of the glass in the melter. When the level of the glass, indicated by the broken line 176, is lowered in the melter 10 so that the tip of the probe 89 is out of contact with the glass, the level sensing relay 170 is activated to de-energize solenoid-operated valve means 156 to a position venting or releasing the air or gas pressure in the melting chamber 10 and in pipes 150, 152, 154 and 166, and energizes the motor 87 to rotate the marble feeding rotor 78 and initiate the feeding of glass marbles 11 or glass batch downwardly through tube 83 into the melter chamber 10. Thus, the pressure on the glass in the melting chamber 10 is relieved during the feeding of glass marbles or glass batch into the melter 10.

The level sensing relay 170 acts in conjunction with the feeder level sensing time-delay relay 132 and the interlocking relay 174 to delay venting or releasing air or gas pressure in the melter 10 until valve 93 is in closed position.

By relieving or reducing the air pressure on the glass in the melter chamber 10, gases or volatiles that may be given off from the glass in the melter are vented through the vent pipe 164. The glass feeding rotor 78 continues to feed marbles or glass batch into the melter 10 until the glass in the melter contacts the level sensing probe 89. When this occurs, the level sensing relay 170 is activated to de-energize the motor 87 thus interrupting the feeding of marbles or glass batch into the melter and the solenoid-operated valve 156 is activated to move the valve means to a position whereby compressed air flows from the supply pipe 160 into pipes 83, 150, 154 and 166 to again establish pressure on the glass in the melter 10.

When the level of the glass, indicated by broken line 178, is lowered in the feeder 16 so that the tip of the probe 130 is out of contact with the glass, the level sensing relay 132 is actuated, and through the differential pressure switch 148 and the interlocking relay 174, the solenoid-operated four-way valve means 118 is actuated to vent the region in the cylinder 106 above the piston and establish air or gas pressure beneath the piston 104 to thereby elevate the piston 104, the valve body 92 and its valve portion 93 to open the entrance to the tube or passage means 12 and permit molten glass under pressure in the melter to flow through the passage means 12 into the stream feeder 16.

The relative position of the valve 93 may be adjusted by releasing the locking nuts 101 and 102, rotating the members 98 and 99, and drawing up the nuts 101 and 102. The air or gas pressure established on the molten glass in the stream feeder 16 is continuously maintained independently of the pressure in the melter 10 so that glass streams 22 continue to be extruded through the orifices in the floor section 18 of the stream feeder so that attenuation of the streams to fibers or filaments is not interrupted during the operation of feeding marbles or glass batch into the melter 10.

The flow or transfer of molten glass from the melter 10 through the pipe or passage means 12 into the stream feeder 16 continues until the level of the glass in the stream feeder 16, indicated by the broken line 178, is raised and the molten glass in the stream feeder 16 contacts the level sensing probe 130.

When this occurs, the level sensing relay 132 is activated to actuate the interlocking relay 174 thereby actuating the solenoid-operated four-way valve means 118 to a position establishing air or gas pressure above the piston 104 thereby moving the valve body 92 and its valve portion 93 downwardly so that the valve portion 93 closes the entrance to the pipe 12 interrupting flow or transfer of molten glass from the melter 10 into the stream feeder 16.

It is preferable that the glass feeding rotor 78 be rotated at a speed to feed glass marbles or glass batch into the melter 10 at substantially the same rate as the rate of stream flow of the glass from the stream feeder. Whenever the stream feeder is fed with glass, the glass in the melter 10 is lowered out of contact with the sensing probe 89, and the level sensing relay 170 will activate the solenoid-operated valve means 156 to vent the pressure in the melter chamber 10 and rotate the glass feeding rotor 78 until the level of the glass, indicated by the broken line 176, engages the probe 89.

Where a hydrocarbon such as propane or the like is utilized as the heat-decomposable material, the pyrolytic decomposition of the hydrocarbon also provides carbon which occurs as a thin layer on the surface of the feeder. The carbon, being nonwettable by the heat-softened glass, provides an added factor in reducing the tendency of the glass to flood over the feeder surface at the stream flow region.

The flow rates of the inert gas and the heat-decomposable hydrogen-bearing material or gas and the proportion of the heat-decomposable hydrogen-bearing material and the inert gas in the environment may be regulated by manipulation of the valves 58 and 64. The decomposable hydrogen-bearing material or hydrocarbon fed to the isolating environment is in an amount only sufficient to be fully decomposed in the isolating environment at the stream feeder surface so that there is no excess decomposable material delivered beyond the isolating environment by the distributors 68 so that there is no combustion or oxidation of the decomposable material.

The comparatively high temperature of the heat-softened glass of 2200°F. or more at the feeder floor region effects pyrolysis of the hydrogen-bearing material or gas and the occurring reaction decomposes the hydrogen-bearing material or gas in the isolating, inert or non-oxidizing environment resulting in the formation of free hydrogen at the interfacial region of the glass and the adjacent surface of the stream feeder.

Through the use of the antiwetting environment at the surface of the stream flow region of the feeder, a comparatively large number of closely spaced orifices or glass flow passages may be provided in the feeder floor section so that a larger number of filaments may be attenuated from a single feeder without the difficulty of the glass wetting and flooding the surface of the feeder.

The beads of glass that form at the orifices are substantially reduced in size as compared with the size of beads formed in a normal atmospheric environment. It is found that a small percentage of hydrocarbon gas in the inert or isolating environment is effective to establish an interfacial non-wetting characteristic, the percentage of hydrocarbon gas being within a range of one-half to give percent of the total volume of the delivered gases.

FIG. 5 illustrates an arrangement wherein the feeder floor section is provided with a large number of closely spaced stream flow orifices or passages in association with distributor means for providing the antiwetting environment at the surface of the orificed feeder floor. In this form the glass stream feeder 182 is provided with a planar floor section 184 having a large number of stream flow orifices or passages 186 arranged in closely spaced relation whereby a large number of glass streams may be delivered from a comparatively small area of the feeder floor section.

The streams flowing from the orifices or passages 186 may be attenuated to filaments in the manner illustrated in FIG. 1 and hereinbefore described. Disposed adjacent the feeder floor section and at opposite sides of the group of streams of glass flowing from the orifices 186 are flattened tubular or hollow members or distributors 188. The hollow members or distributors 188 are connected to and supported by a tubular manifold 190 disposed adjacent an end region of the stream feeder 182.

The manifold 190 is connected by a pipe 54' with a tee or mixing chamber 55'. One branch of the tee fitting is connected by a pipe 56' with a regulating valve 58', the latter being connected by a pipe 60' with a supply of inert gas such as carbon dioxide under pressure. Another branch of the fitting 55' is connected by a pipe 62' with a regulating valve 64' which is connected by a pipe 65' with a supply of decomposable hydrogen-bearing gas, such as propane.

Through this arrangement, a mixture of an inert gas and a heat-decomposable hydrogen-bearing gas is delivered to the manifold 190. The hollow members or distributors 188 are fashioned with lengthwise arranged spaced slots or passages 192 through which the mixture of gases is delivered into the stream flow region of the feeder floor 184 and embracing the cones of glass of the glass streams delivered through the orifices 186.

The hydrogen-bearing gas in the inert environment provided by the carbon dioxide or other inert gas is decomposed by the intense heat from the feeder and the glass streams, providing hydrogen effective to reduce or substantially eliminate the tendency for the glass to flood over the stream flow surface of the stream feeder and to prevent cohesion of adjacent beads of glass formed at the orifices 186 during start-up of attenuating operations.

The stream feeder 182 is provided with terminal lugs 183 for connection with electric current supply conductors for heating the stream feeder to maintain the glass therein in a condition whereby streams of the glass flow through the orifices 186. The stream feeder 182 receives glass from a supply chamber, such as the chamber 10 shown in FIG. 1, through a passage means or tubular member 12'. A tubular member 126' of a temperature sensing means extends into the feeder 182 as in the arrangement shown in FIGS. 1 and 2.

The stream feeder 182 is pressurized by supplying gas under pressure through the member 126' in the same manner as hereinbefore described in connection with FIG. 2, and the pressurizing of the supply chamber and the controls for controlling or regulating transfer of molten glass from a supply chamber through passage means or member 12' into the feeder 182 are of the character shown in FIG. 2 and hereinbefore described.

It is apparent that, within the scope of the invention, modifications and different arrangements may be made other than as herein disclosed, and the present disclosure is illustrative merely, the invention comprehending all variations thereof.

We claim:

1. The method of processing glass comprising establishing a supply of molten glass in a chamber, transferring molten glass from the supply into a stream feeder, establishing gas pressure on the molten glass in the stream feeder, flowing streams of glass from the feeder under the influence of the pressure on the molten glass in the feeder, attenuating the streams of glass to fibers, and establishing gas pressure on the molten glass in the chamber to effect transfer of molten glass from the chamber into the stream feeder.

2. The method according to claim 1 including interrupting transfer of glass from the chamber into the feeder when the glass in the feeder reaches a predetermined level, and initiating transfer of glass from the chamber into the feeder when the glass in the feeder falls below the predetermined level.

3. Apparatus for processing heat-softened glass including, in combination, a glass melting chamber, a stream feeder having a floor section provided with a plurality of orifices through which flow streams of heat-softened glass, means connecting the melting chamber with the stream feeder for flowing glass from the chamber into the stream feeder, means for establishing gas pressure on the heat-softened glass in the stream feeder, means for establishing gas pressure on the heat-softened glass in the melting chamber, feeding means for feeding glass into the melting chamber, valve means for controlling flow of glass from the melting chamber into the stream feeder, sensing means for sensing the level of molten glass in the stream feeder, means activated by the sensing means for actuating said valve means, distributor means disposed adjacent the stream flow section, said distributor means adapted to deliver an inert gas and a heat-decomposable hydrogen-bearing material at the stream flow section, the hydrogen-bearing material being decomposed by the heat of the glass providing hydrogen at the surface of the stream flow section to promote separation of the glass from the surface of the stream flow region, and means for attenuating the glass streams to fibers.

4. The method of processing glass including introducing glass into a chamber, heating the glass in the chamber to maintain the glass in a flowable condition, establishing pressure on the molten glass in the chamber, flowing molten glass from the chamber into a feeder, establishing pressure on the molten glass in the feeder, flowing streams of glass from the feeder under the influence of pressure on the molten glass in the feeder, the pressure on the molten glass in the chamber being sufficient to effect flow of glass from the chamber into the pressurized feeder, and attenuating the streams of glass to fibers.

5. The combination according to claim 3 including second sensing means for sensing the level of the glass in the chamber, means activated by the second sensing means for controlling the feeding means for feeding the glass into the chamber, and means rendered effective when the glass feeding means is feeding glass into the chamber for closing the valve means to interrupt flow of glass from the chamber into the stream feeder.

6. The method of processing glass including introducing glass into a chamber, heating the glass in the chamber to maintain the glass in a molten condition, establishing pressure on the molten glass in the chamber, flowing molten glass from the chamber into a feeder, establishing an isolating environment at a surface of the feeder containing the molten glass and having orifices from which flow streams of the glass, attenuating the streams of glass to fibers, providing a hydrogen-bearing material in the isolating environment which at the temperature of the molten glass is decomposed to provide hydrogen in an amount effective at the interfacial region of the glass with the feeder to reduce the wetting effect of the glass and promote separation of the glass from the orificed surface of the feeder, and effecting pressure through the glass in the feeder to resist permeation of the hydrogen through the stream feeder surface at the stream flow region.

7. The combination according to claim 3 including second valve means rendered effective during the feeding of glass into the chamber for reducing the pressure on the glass in the chamber.

8. The method of processing heat-softened glass comprising molten glass in a chamber, flowing the molten glass from the chamber into a stream feeder having an orificed stream flow section, establishing an isolating environment at the stream flow section of the feeder in which a hydrogen-bearing material is heat-decomposed providing hydrogen in the environment for promoting separation of the heat-softened glass from the feeder surface at the stream flow region, establishing pressure on the heat-softened glass in the stream feeder to flow streams of glass from the flow section and to resist permeation of the hydrogen through the stream flow section of the feeder, attenuating the streams of glass to fibers, establishing pressure on the glass in the melting chamber sufficient to effect transfer of molten glass from the chamber into the stream feeder, applying heat to the stream feeder to maintain the molten glass therein at a substantially constant velocity, and feeding glass into the melting chamber to maintain a substantially constant level of glass in the melting chamber.

9. The method according to claim 8 including the step of reducing the pressure on the glass in the melting chamber during the feeding of glass into the chamber without affecting the pressure on the molten glass in the stream feeder.

10. The method according to claim 8 wherein the isolating environment includes an inert gas selected from the group comprising carbon dioxide, nitrogen, helium, argon, neon and xenon.

11. The method according to claim 8 wherein the hydrogen-bearing material is a hydrocarbon.

12. The method according to claim 8 wherein the hydrogen-bearing material is a heat-decomposable gas selected from the group comprising methane, ethane, propane, butane, isobutane, ethylene, propylene, acetylene, cyclopropane, naphthene, ammonia and dichlorodifluoromethane.

13. The method of processing glass comprising providing a supply of molten glass in a chamber, flowing molten glass from the chamber into a stream feeder having an orificed section from which flow means streams of the glass, attenuating the streams of glass to fibers, establishing an isolating environment at the stream flow section of the feeder, delivering a hydrogen-bearing material to the isolating environment, decomposing the hydrogen-bearing material by the heat of the glass in the isolating environment providing hydrogen for promoting separation of the heat-softened glass from the feeder surface at the stream flow region, establishing pressure on the heat-softened glass in the stream feeder effective to flow streams of glass from the feeder and to resist permeation of the hydrogen through the stream flow section of the feeder, establishing sufficient pressure on the molten glass in the chamber to effect flow of molten glass from the chamber into the stream feeder, feeding glass into the chamber to maintain a substantially constant level of glass in the chamber, and controlling flow of glass from the chamber into the stream feeder for maintaining a substantially constant level of glass in the stream feeder.

14. The method of processing heat-softened glass comprising providing molten glass in a chamber, flowing molten glass from the chamber into a stream feeder having an orificed stream flow section from which flow streams of the glass, attenuating the streams of glass to fibers, establishing a gaseous environment at the stream flow section of the feeder including a material which is decomposed by the heat of the glass providing hydrogen for promoting separation of the glass from the surface of the stream flow section, establishing pressure on the molten glass in the stream feeder to flow streams of glass from the feeder and to resist permeation of the hydrogen through the stream flow section of the feeder, and establishing pressure on the glass in the chamber effective to transfer molten glass from the chamber into the feeder.

15. The method of processing glass including feeding glass into a chamber, heating the glass in the chamber to render the glass in a molten condition, establishing pressure on the molten glass in the chamber, flowing molten glass from the chamber into a stream feeder, establishing pressure on the molten glass in the feeder, flowing streams of glass from the feeder under the influence of pressure on the molten glass in the feeder, attenuating the streams of glass to fibers, the pressure on the molten glass in the chamber being sufficient to effect flow of glass from the chamber into the pressurized feeder, establishing an inert gaseous environment at the stream flow region of the feeder, decomposing a hydrogen-bearing material in the environment providing hydrogen at the stream flow region of the feeder for promoting separation of the heat-softened glass from the feeder surface at the stream flow region, the pressure on the molten glass in the feeder substantially preventing permeation of the hydrogen through the material of the feeder at the stream flow region.

16. Apparatus for processing glass comprising means for feeding glass into a melting chamber, means for heating the chamber to render the glass in a flowable condition, means for establishing pressure on the glass in the melting chamber, a feeder having stream flow orifices therein, means for establishing pressure on the molten glass in the feeder to discharge streams of the glass through the orifices, means for attenuatinng the streams of glass to fibers, passage means connecting the melting chamber with the feeder, the pressure on the molten glass in the chamber being sufficient to effect flow of glass from the pressurized chamber through the passage means into the pressurized feeder.

17. The combination according to claim 16 wherein the means for establishing pressure on the glass in the chamber is compressed gas.

18. The combination according to claim 16 wherein the means for establishing pressure on the glass in the feeder is compressed gas.

19. Apparatus for processing glass including, in combination, a chamber adapted to contain molten glass, a stream feeder having a floor section provided with orifices through which flow streams of the molten glass, passage means for transferring molten glass from the chamber into the stream feeder, means for establishing pressure on the glass in the chamber to effect transfer of molten glass from the chamber into the stream feeder, means for establishing pressure on the glass in the stream feeder to flow streams of glass from the feeder, means for attenuating the glass streams to fibers, valve means for controlling flow of molten glass from the chamber into the stream feeder, means for sensing the level of molten glass in the stream feeder, and means activated by the sensing means for actuating said glass flow controlling valve means.

20. The combination according to claim 19 including second means for sensing the level of the glass in the chamber, feeding means for feeding glass into the chamber, and means activated by said second sensing means for controlling the means feeding glass into the chamber.

21. Apparatus for processing glass comprising means for feeding glass into a chamber, means for heating the chamber to render the glass in a flowable condition, a stream feeder, means for establishing pressure on the glass in the chamber to effect flow of glass from the pressurized chamber into the stream feeder, said feeder having a section provided with orifices from which flow streams of the glass, means for delivering an inert gas containing a hydrogen-bearing material at the stream flow region of the feeder, said hydrogen-bearing material being decomposed by heat from the feeder providing hydrogen at the stream flow section of the feeder for promoting separation of the glass from the feeder surface at the stream flow section, means for establishing sufficient pressure on the glass in the feeder to flow streams of glass from the feeder and to prevent permeation of the hydrogen through the material of the feeder at the stream flow region, and means for attenuating the glass streams to fibers.

22. The combination according to claim 21 wherein the means establishing pressure on the heat-softened glass in the feeder is a compressed gas.

23. Apparatus for processing heat-softened glass comprising a chamber adapted to contain a supply of heat-softened glass, a stream feeder connected with the chamber and having a section provided with orifices from which flow streams of the glass, means for establishing pressure on the glass in the chamber to effect transfer of glass into the feeder, means for delivering an inert gas containing a hydrogen-bearing material at the stream flow region of the feeder, said hydrogen-bearing material being decomposed by heat from the feeder providing hydrogen at the stream flow section of the feeder for promoting separation of the heat-softened glass from the feeder surface at the stream flow section, means for establishing sufficient pressure on the heat-softened glass in the feeder to flow streams of glass from the feeder and to prevent permeation of the hydrogen through the material of the feeder at the stream flow region, and means for attenuating the glass streams to fibers.

24. The method of processing heat-softenable fiber-forming mineral material comprising introducing mineral material into a chamber, heating the material in the chamber to maintain the material in a molten condition, establishing pressure on the molten material in the chamber, flowing molten material from the chamber into a feeder, establishing an isolating environment at a surface of the feeder having orifices from which flow streams of the mineral material, attenuating the streams of mineral material to fibers, providing a gas in the isolating environment which at the temperature of the molten material is decomposed to provide a gas resulting from the decomposition capable of permeating through the feeder surface and provided in an amount at the interfacial region of the molten material with the feeder effective to reduce the wetting effect of the material and promote separation of the material from the orificed surface of the feeder, and effecting pressure through the molten material in the feeder in an amount sufficient to resist permeation of the gas resulting from decomposition through the stream feeder surface at the stream flow region.

25. The method of processing glass comprising introducing glass into a chamber, heating the glass in the chamber to maintain the glass in a molten condition, establishing pressure on the molten glass in the chamber, flowing glass from the chamber into a feeder, establishing an isolating environment at a surface of the feeder having orifices from which flow streams of the glass, attenuating the glass streams to fibers, providing a gas in the isolating environment which at the temperature of the glass is decomposed to provide a gas resulting from the decomposition capable of permeating through the feeder surface in an amount effective at the interfacial region of the glass with the feeder to reduce the wetting effect of the glass and promote separation of the glass from the orificed surface of the feeder, and effecting pressure through the glass in the feeder in an amount sufficient to resist permeation of the gas of decomposition through the stream feeder surface at the stream flow region.

* * * * *